United States Patent
Yoshikawa et al.

(10) Patent No.: US 10,628,083 B2
(45) Date of Patent: Apr. 21, 2020

(54) STORAGE SYSTEM AND STORAGE SYSTEM MANAGEMENT METHOD

(71) Applicant: HITACHI, LTD., Tokyo (JP)

(72) Inventors: Takao Yoshikawa, Tokyo (JP); Yusuke Nonaka, Tokyo (JP); Jin Choi, Tokyo (JP); Masahide Kawarasaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 77 days.

(21) Appl. No.: 16/081,254

(22) PCT Filed: Sep. 27, 2016

(86) PCT No.: PCT/JP2016/078333
§ 371 (c)(1),
(2) Date: Aug. 30, 2018

(87) PCT Pub. No.: WO2018/061068
PCT Pub. Date: Apr. 5, 2018

(65) Prior Publication Data
US 2019/0073159 A1 Mar. 7, 2019

(51) Int. Cl.
*G06F 3/06* (2006.01)
*G06F 11/30* (2006.01)
*G06F 11/34* (2006.01)

(52) U.S. Cl.
CPC .......... *G06F 3/0659* (2013.01); *G06F 3/0604* (2013.01); *G06F 3/0611* (2013.01); *G06F 3/0653* (2013.01); *G06F 3/0658* (2013.01); *G06F 3/0689* (2013.01); *G06F 11/3034* (2013.01); *G06F 11/3419* (2013.01); *G06F 11/3485* (2013.01); *G06F 2206/1012* (2013.01)

(58) Field of Classification Search
CPC .... G06F 3/0689; G06F 3/0683; G06F 3/0653; G06F 3/061–067
See application file for complete search history.

(56) References Cited

U.S. PATENT DOCUMENTS 6,553,476 B1 * 4/2003 Ayaki .................... G06F 3/0601
                                                  711/204
7,003,644 B2 * 2/2006 Heath .................... G06F 3/0601
                                                  711/112
(Continued)

FOREIGN PATENT DOCUMENTS

JP         4318914 B2    8/2009

OTHER PUBLICATIONS

H. Howie Huang, Andrew S. Grimshaw, "Automated Performance Control in a Virtual Distributed Storage System". 9th Grid Computing Conference. IEEE 2008 (Year: 2008).*

(Continued)

*Primary Examiner* — Khoa D Doan
(74) *Attorney, Agent, or Firm* — Volpe and Koenig, P.C.

(57) ABSTRACT

A storage controller measures a RAID group (RG) operating time, which is the operating time of an RG. The storage controller then corrects the measured RG operating time, which is used to calculate the operating rate of the RG, on the basis of a correction coefficient associated with the type of the physical devices (PDEVs) constituting the RG, and on the basis of the RG backend multiplicity, which is the multiplicity of the I/O commands transmitted to the RG.

10 Claims, 16 Drawing Sheets

(56) References Cited

U.S. PATENT DOCUMENTS

| | | | |
|---|---|---|---|
| 7,035,971 B1 * | 4/2006 | Merchant | G06F 11/3433 |
| | | | 711/112 |
| 9,135,166 B1 * | 9/2015 | Syu | G11C 16/3431 |
| 9,256,533 B2 * | 2/2016 | Benhase | G06F 12/0802 |
| 9,747,040 B1 * | 8/2017 | Balakrishnan | G06F 3/0611 |
| 10,298,611 B1 * | 5/2019 | Caldwell | H04L 63/029 |
| 2004/0133707 A1 | 7/2004 | Yoshiya et al. | |
| 2007/0005922 A1 * | 1/2007 | Swaminathan | G06F 13/1689 |
| | | | 711/167 |
| 2016/0342328 A1 * | 11/2016 | Rangarajan | G06F 3/061 |

OTHER PUBLICATIONS

Zhou Liu, Jian Zhou, Weikuan Yu, Fei Wu, Xiao Qin, Changsheng Xie, "MIND: A black-box energy consumption model for disk arrays". 2011 International Green Computing Conference and Workshops (pp. 1-6) (Year: 2011).*

* cited by examiner

FIG. 9

PDEV table
128

| PDEV number | Installation flag |
|---|---|
| D0 | OFF |
| D1 | ON |
| D2 | ON |
| ... | - |
| Dn | OFF |

FIG. 10

RG table
130

| RG number | RAID level | RAID configuration | PDEV type | PDEV numbers | | | | | | | |
|---|---|---|---|---|---|---|---|---|---|---|---|
| R0 | RAID1 | 2D2D | HDD | D1 | D2 | D3 | D4 | - | - | - | - |
| R1 | RAID5 | 7D1P | SSD-a | D10 | D11 | D12 | D13 | D14 | D15 | D16 | D17 |
| ... | ... | ... | ... | ... | ... | ... | ... | ... | ... | ... | ... |
| Rn | ... | ... | ... | ... | ... | ... | ... | ... | ... | ... | ... |

FIG. 11

Correction coefficient table
136

| PDEV type | RAID 1 | RAID 5 | | RAID6 | |
|---|---|---|---|---|---|
| | 2D2D | 3D1P | 7D1P | 6D2P | 14D2P |
| HDD | 0 | 0 | 0 | 0 | 0 |
| SSD-a | a1 | a2 | a3 | a4 | a5 |
| SSD-b | b1 | b2 | b3 | b4 | b5 |
| ... | ... | ... | ... | ... | ... |

FIG. 12

Correction flag table
136

| PDEV type | RR | RW | SR | SW |
|---|---|---|---|---|
| HDD | OFF | OFF | OFF | OFF |
| SSD-a | ON | ON | OFF | OFF |
| SSD-b | ON | ON | OFF | OFF |
| ... | ... | ... | ... | ... |

STORAGE SYSTEM AND STORAGE SYSTEM MANAGEMENT METHOD

TECHNICAL FIELD

The present invention is generally related to managing a storage system.

BACKGROUND ART

A storage system is known which, when a host Input/Output (I/O) request exceeding the system load of the storage system is made, returns an error response to the host without processing the host I/O request (PTL 1).

CITATION LIST

Patent Literature

[PTL 1] Japanese Patent No. 4318914, Descriptin

SUMMARY OF INVENTION

Technical Problem

Generally, storage system includes a RAID group (hereinafter, "RG") and a storage controller for controlling I/O to and from the RAID group. "RAID" stands for Redundant Array of Independent (or Inexpensive) Disks. The RG is structured with either a plurality of PDEVs (which are typically PDEVs of mutually the same type) or a plurality of storage areas based on a plurality of PDEVs. The RG stored data therein according to a RAID level associated with the RAID group. "PDEV" denotes physical storage device and typically denotes non-volatile storage device (e.g., auxiliary storage device).

Examples of the system load (the load of a storage system) include an RG operating rate. The RG operating rate is calculated on the basis of an operating status of the RG (operating statuses of the PDEVs configuring the RG). For administrators, the RG operating rate serves as a factor that determines details or timing of work such as increasing or decreasing the number of RGs or distributing I/O loads (e.g., changing the RG used as a base of a logical volume provided to a host). To provide an appropriate value as the RG operating rate, it is desirable to be able to accurately identify the operating statuses of the PDEVs configuring the RG.

It is expected that it is possible to understand the actual operating statuses of the PDEVs by acquiring, from the PDEVs, information indicating the operating statuses of the PDEVs. However, from some PDEVs having no function to transmit such information indicating the operating statuses thereof, it is not possible to acquire the information.

Solution to Problem

A storage controller measures a RAID group (RG) operating time, which is the operating time of an RG. The storage controller corrects the RG operating time, which is used to calculate the operating rate of the RG, on the basis of a correction coefficient corresponding to the type of the physical devices (PDEVs) of the RG and RG backend multiplicity which is the multiplicity of the I/O commands to the RG.

Advantageous Effects of Invention

It is possible to provide an appropriate value as the value of the load, without the need to acquire the information indicating the operating statuses of the PDEVs from the PDEVs.

BRIEF DESCRIPTION OF DRAWINGS

FIG. 9 is a diagram illustrating a configuration of a PDEV table.

FIG. 10 is a diagram illustrating a configuration of an RG table.

FIG. 11 is a diagram illustrating a configuration of a correction coefficient table.

FIG. 12 is a diagram illustrating a configuration of a correction flag table.

DESCRIPTION OF EMBODIMENTS

Figure 1:
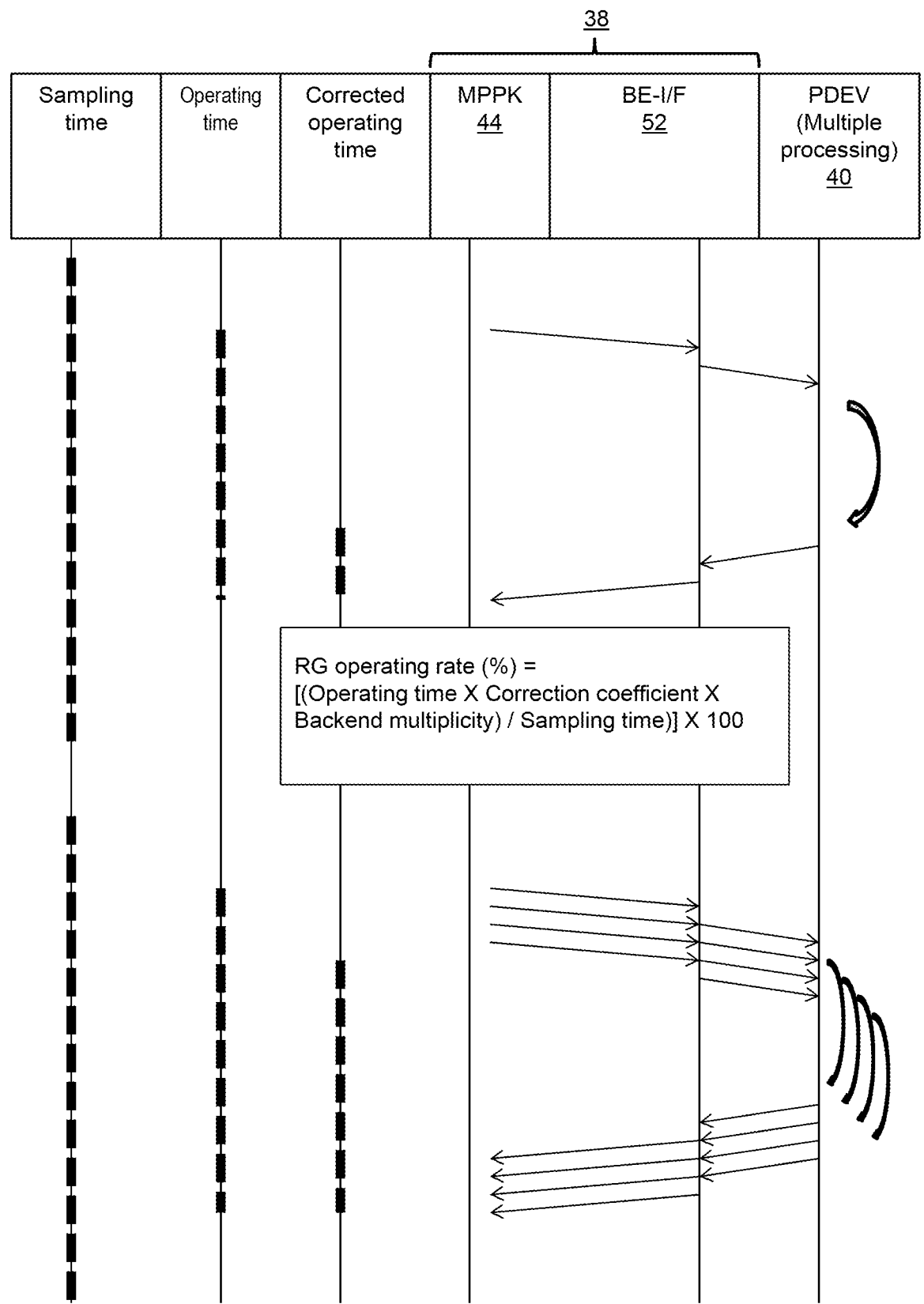
FIG. 1 is a schematic chart illustrating an outline of an embodiment.

An embodiment will be explained below, with reference to the drawings.

In the following explanations, an "interface unit" denotes one or more interfaces. The one or more interfaces may be one or more interface devices of mutually the same type (e.g., one or more Network Interface Cards (NICs)) or two or more interface devices of mutually-different types (e.g., NIC and Host Bus Adapter (HBA)). Further, in the following explanations, interface device may simply be referred to as "I/F".

Further, in the following explanations, a "memory unit" denotes one or more memories. At least one memory may be a volatile memory or a non-volatile memory.

Further, in the following explanations, a "processor unit" denotes one or more processors. At least one processor is typically a Central Processing Unit (CPU). The processor may include a hardware circuit configured to perform a part or all of the processes. Each of the processors may be a single-core processor or a multi-core processor.

In the following explanations, a "VOL" stands for a logical volume, which may be a logical storage device. The VOL may be a substantial VOL based on one or more PDEVs (typically an RG) or may be a virtual VOL that is not based on one or more PDEVs.

Further, in the following explanations, information may be described by using an expression such as a "xxx table". Such information may be represented by using any data structure. In other words, to indicate that such information is not dependent on the data structure thereof, the "xxx table" may be rephrased as "xxx information". Further, in the following explanations, the configuration of each of the tables is merely an example. Each of the tables may be divided into two or more tables. Conversely, all or a part of two or more of the tables may be incorporated into one table.

Further, in the following explanations, when elements of mutually the same type are referred to without any distinction therebetween, a reference character (or a common part of reference characters) may be used. On the contrary, when elements of mutually the same type are referred to while distinguishing one from another, an ID of the element (or a reference character of the element) may be used. For example, when cores are referred to without any distinction therebetween, the cores will be referred to as "cores 54". When the cores are referred to while being distinguished from one another, the cores will be referred to as "a representative core 54R" and "a normal core 54N".

Further, in the following explanations, a "storage system" may denote one or more physical storage apparatuses or may include at least one virtual storage apparatus (e.g., a Software Defined Storage (SDS)).

Further, in the following explanation, an "host computer" denotes an example of a host system. The host system may be represented by one or more physical host computers or may be represented by at least one virtual host computer (e.g., a Virtual Machine [VM]).

Further, in the following explanations, a "management computer" denotes an example of a management system. The "management system" may include one or more computers. More specifically, for example, when a management computer has a display device, so that the management computer displays information on the display device thereof, the management computer is a management system. Further, for example, when a management computer (e.g., a server) transmits information to be displayed to a remote display computer (e.g., a client), so that the display computer displays the information (i.e., when the management computer displays information on the display computer), a system including at least the management computer selected from between the management computer and the display computer may be the management system.

FIG. 1 is a schematic chart illustrating an outline of an embodiment.

A storage controller 38 includes a Microprocessor (MP) Package (MPPK) 44 and a Backend Interface (BE-I/F) 52. A PDEV 40 is coupled to the BE-IF 52. The MPPK 44 calculates an RG load, without acquiring information indicating a PDEV load from the PDEV 40. More accurately, the MPPK 44 predicts the RG load.

More specifically, in the present embodiment, an RG operating rate is used as the RG load. The MPPK 44 calculates the RG operating rate on the basis of operating time of the PDEVs in the RG and a sampling time length. At that time, the MPPK 44 corrects the operating time and further calculates the RG operating rate on the basis of the corrected operating time. The operating time is corrected on the basis of a correction coefficient and a backend multiplicity value. The "operating time" is an example of a PDEV operating status and is expressed as the time length from the time when the MPPK 44 issues (e.g., registers) an I/O command to a PDEV 40 to the time when the MPPK 44 receives a response to the I/O command. The "sampling time" is a time length used as a reference.

Figure 2:
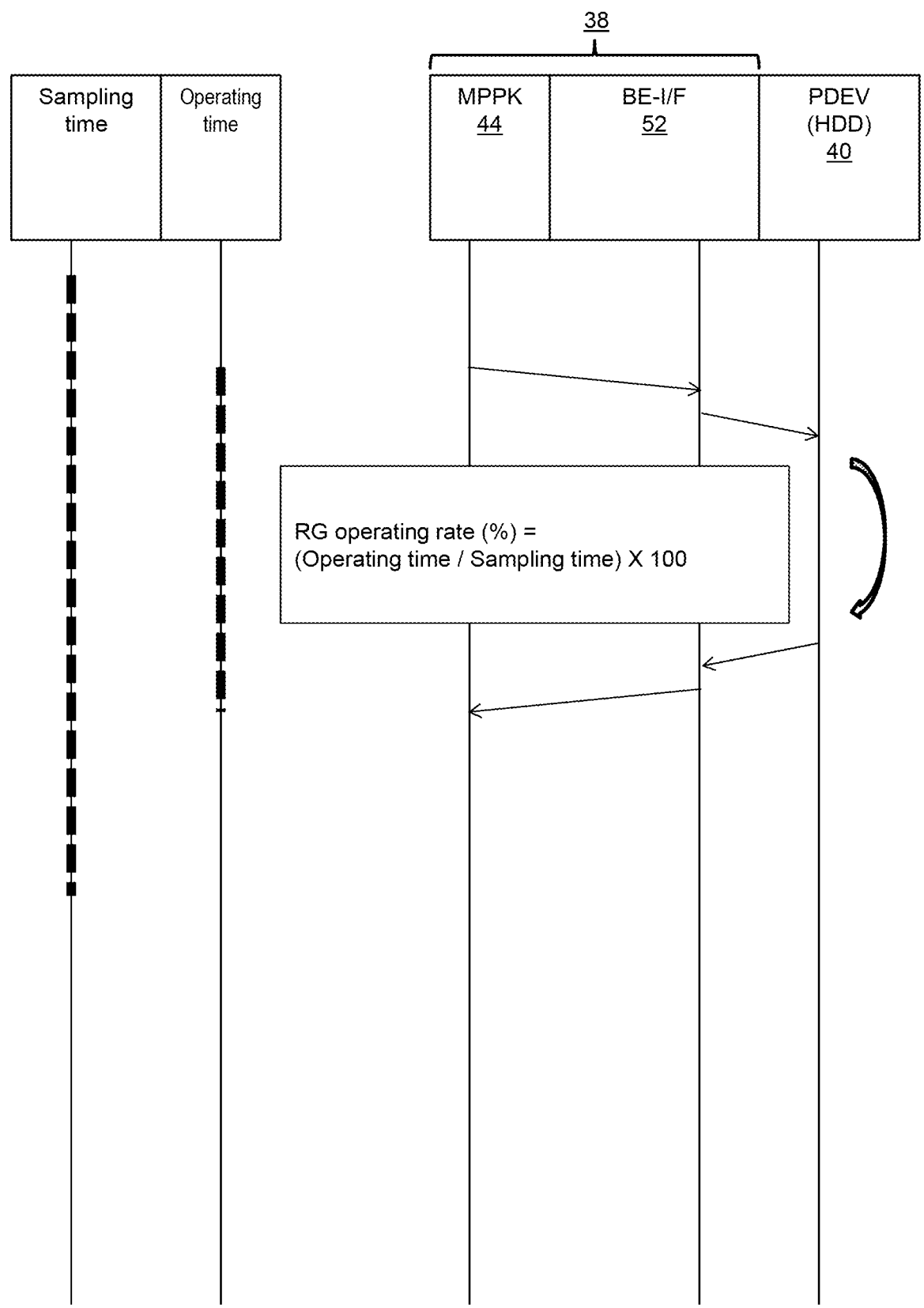
FIG. 2 is a schematic chart illustrating an example of calculating a PDEV operating rate.
Figure 3:
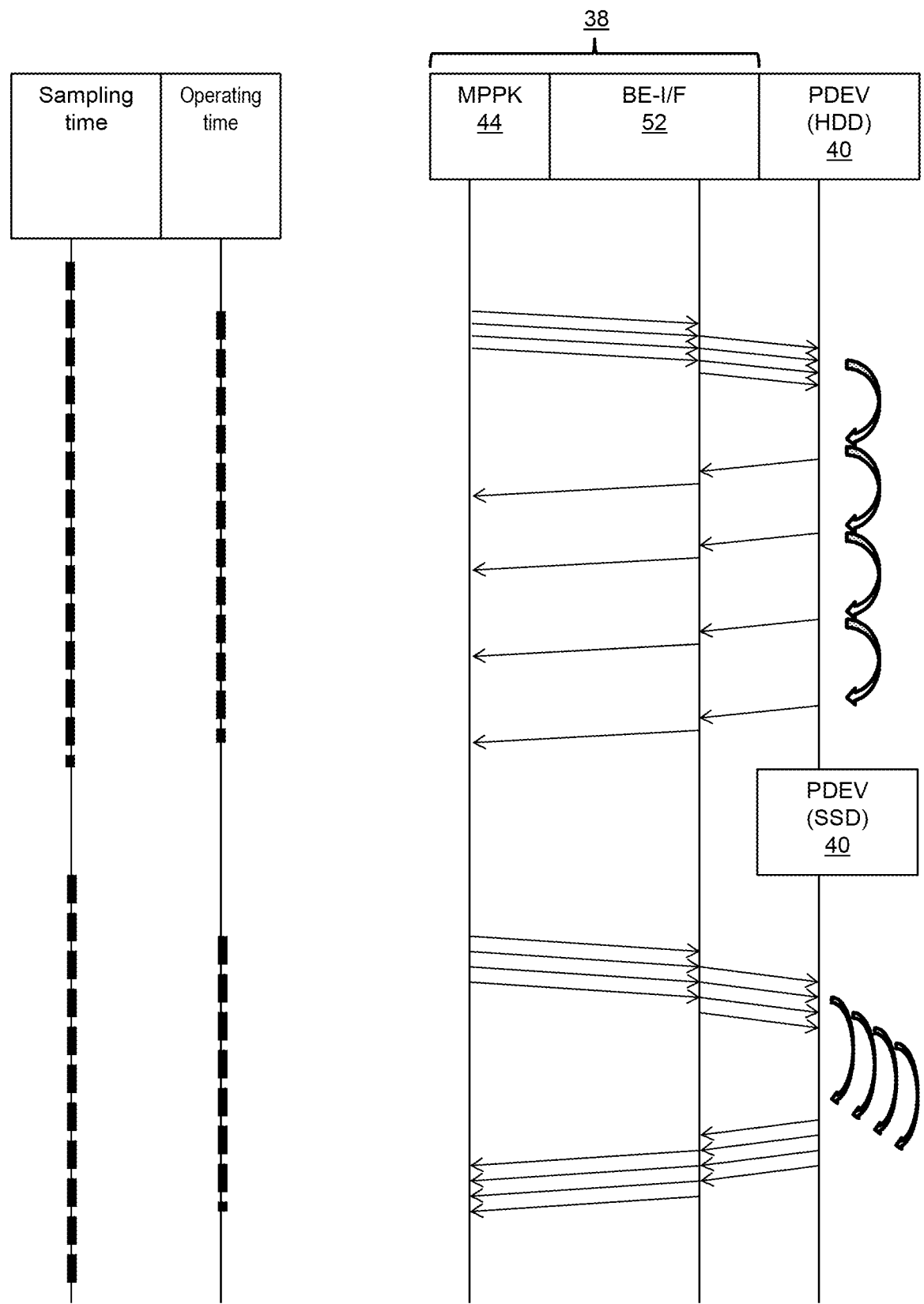
FIG. 3 is a schematic chart illustrating an example of a relationship between I/O command multiplicity values and operating time for a successive processing PDEV and for a multiple processing PDEV.

As illustrated in FIG. 2, generally, a Hard Disk Drive (HDD) may be used as the PDEV 40. Because HDDs have mechanical operations such as moving a magnetic head or rotating a magnetic disk, I/O commands are processed one by one. As for such a successive processing PDEV, which is a PDEV processing I/O commands one by one, the MPPK 44 is able to calculate the ratio of the operating time thereof to the sampling time as an RG operating rate. Also, as illustrated in FIG. 3, when the MPPK 44 has issued a plurality of I/O commands to an HDD, which is an example of the successive processing PDEV, the MPPK 44 is able to calculate the ratio of the operating time to the sampling time as an RG operating rate. The reason is that the plurality of I/O commands are processed one by one.

However, some PDEVs are multiple processing PDEVs, which are PDEVs each capable of processing a plurality of I/O commands in a multiplexed manner. Examples of multiple processing PDEVs include a PDEV having a semiconductor memory as a storage medium thereof, e.g., a Solid State Drive (SSD). With regard to an SSD, which is an example of the multiple processing PDEVs, when a comparison is made between when there is only one I/O command and when there are a plurality of I/O commands, the operating time viewed from the MPPK 44 does not exhibit so much difference as the difference in the actual operating statuses, although the actual operating statuses within the multiple processing PDEV is different. For this reason, if the method for calculating the operating rate of a successive processing RG (an RG structured with successive processing PDEVs) was applied, without any modification, to a multiple processing RG (an RG structured with multiple processing PDEVs), it would be impossible to calculate an appropriate RG operating rate. In other words, it would be impossible to correctly predict the operating status of the RG.

To cope with this situation, in the present embodiment, the backend multiplicity value is taken into account for the calculation of the operating rate of the multiple processing RG, as mentioned above. With this arrangement, it is expected that it is possible to calculate an appropriate operating rate for the multiple processing RG.

Further, in the present embodiment, for a multiple processing PDEV, the operating time thereof is corrected on the basis of the backend multiplicity value. As a result, it is expected that it is possible to calculate an appropriate operating rate also for a multiple processing RG, while maintaining the method by which the ratio of the operating time to the sampling time is calculated as an RG operating rate, i.e., the method that is able to calculate an appropriate operating rate for a successive processing RG.

The operating time is corrected on the basis of a correction coefficient and the backend multiplicity value, as mentioned above. As illustrated in FIG. 1, when the correction coefficient has the same value, the smaller the backend multiplicity value is, the shorter is the corrected operating time. More specifically, for example, the corrected operating time is a product of the operating time, the correction coefficient, and the backend multiplicity value.

Figure 4:
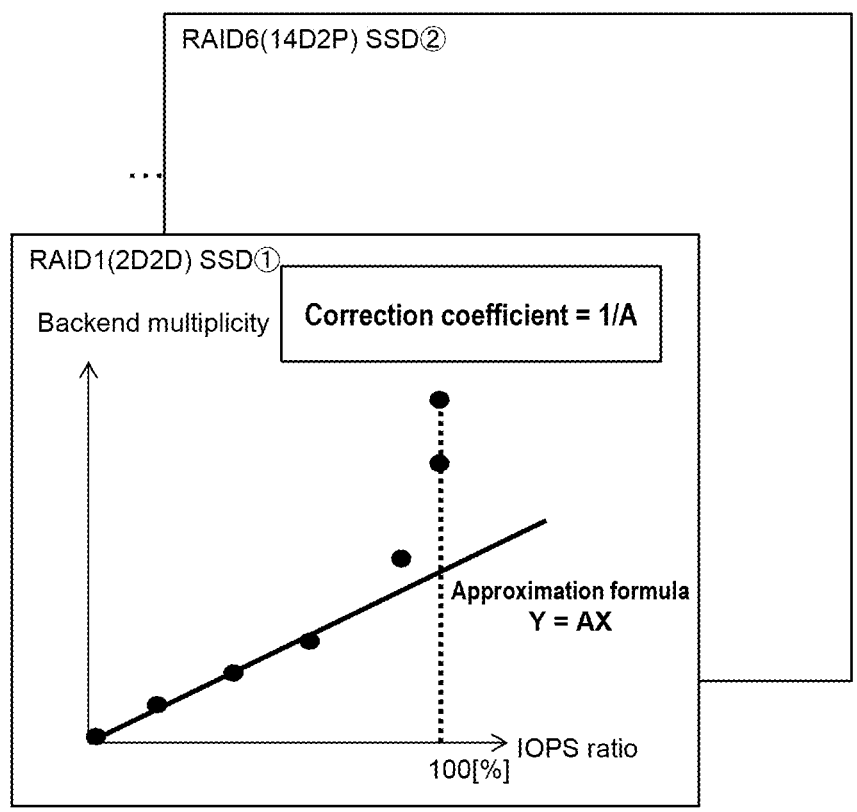
FIG. 4 is a schematic chart illustrating a method for calculating a correction coefficient.

As illustrated in FIG. 4, the correction coefficient is a value calculated on the basis of a relationship between actual measured values of the load on the frontend side of the storage controller 38 and actual measured values of the load on the backend side of the storage controller 38. More specifically, for example, the correction coefficient is determined on the basis of a slope A of a linear expression which is obtained as an approximation formula and of which the X-axis expresses the load on the frontend side, whereas the Y-axis expresses the load on the backend side (for example, the correction coefficient is the reciprocal of the slope A). An example of the "load on the frontend side" is an I/O Per Second (IOPS) ratio. The "IOPS ratio" is a ratio (the maximum value:100%) of the number of I/O commands actually processed per second to the maximum number of I/O commands that can possibly be processed per second according to an access pattern from a host computer, which is variable. An example of the "load on the backend side" is the backend multiplicity value. The "backend multiplicity value" denotes the degree of multiplicity of the I/O commands issued by the MPPK 44 to the PDEV 40, in other words, the number of I/O commands that are issued in a multiplexed manner. In this situation, the approximation formula is determined, as illustrated in FIG. 4 for example, while ignoring such a range of IOPS ratios where the backend multiplicity value rapidly increases. Further, as illustrated in FIG. 4, for example, the correction coefficient is prepared in accordance with one or both of the type of the RAID (a set made up of a RAID level and a RAID configuration) and the type of the PDEV. In the present embodiment, the correction coefficient is prepared for each of the sets made up of a RAID type and a PDEV type. For each of the sets made up of a RAID type and a PDEV type, a relationship between IOPS ratios and backend multiplicity values may be measured in advance, so as to prepare a correction coefficient in advance on the basis of the actual measured values. In the present embodiment, the correction coefficient is a static value that is prepared in advance.

In the following sections, the present embodiment will be explained in detail.

Figure 5:
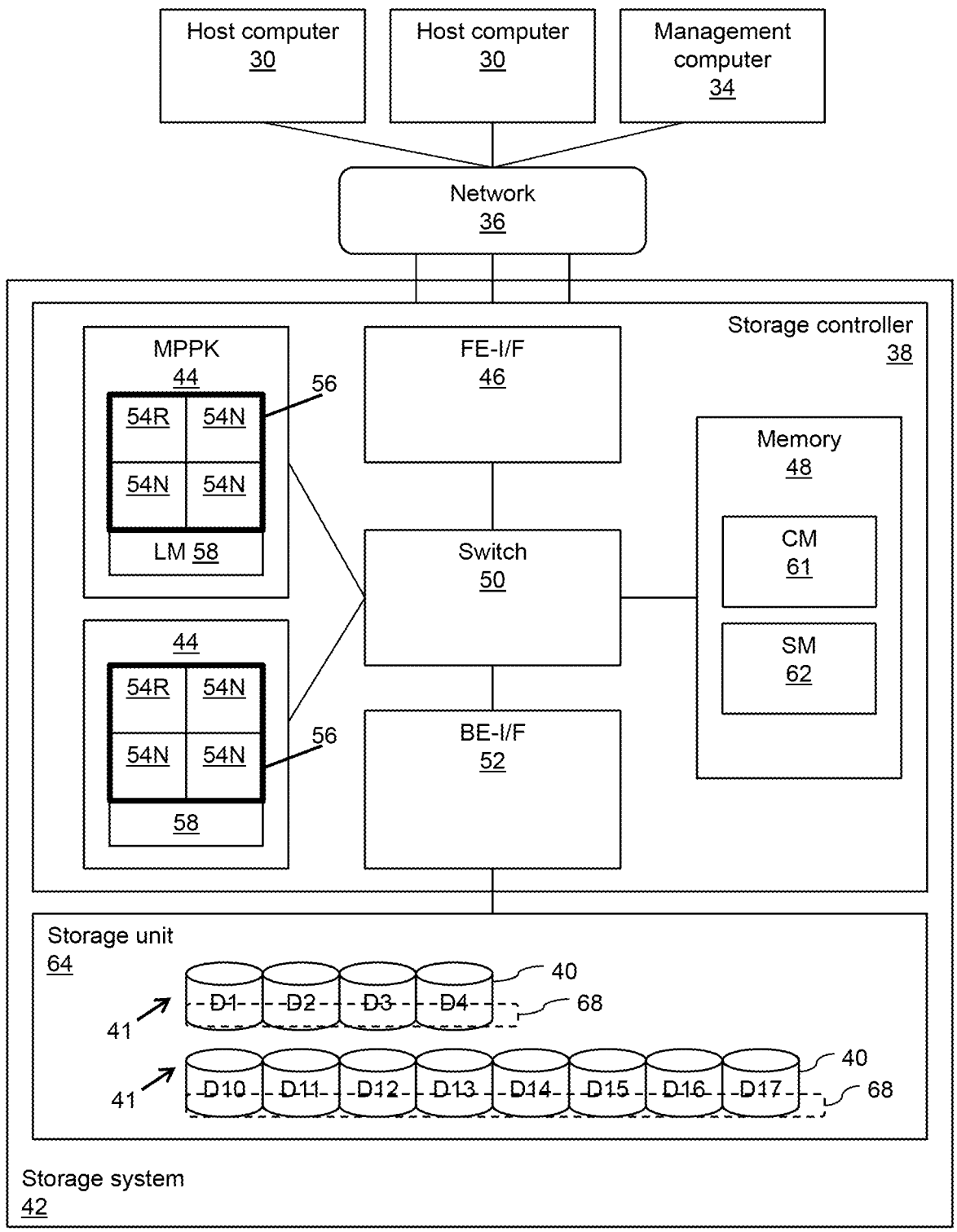
FIG. 5 is a block diagram illustrating a configuration of a storage system.

FIG. 5 is a block diagram illustrating a configuration of a storage system.

To a storage system 42, host computers 30 and a management computer 34 are coupled via a network 36 (one or more communication networks). The network 36 may be one or more networks among, for example, Fibre Channel Storage Area Networks (FC SANs), Internet Protocol Storage Area Networks (IP SANs), Local Area Networks (LANs), and Wide Area Networks (WANs).

For example, the host computer 30 is a computer apparatus provided with information processing resources such as a Central Processing Unit (CPU), a memory, an input/output interface, and the like. For example, the host computer 30 is configured as a personal computer, a workstation, a main frame, or the like. The host computer 30 is able to access a VOL 68, by issuing an I/O request (e.g., a write request or a read request) designating the VOL 68 provided from the storage system 42, to the storage system 42.

The management computer 34 receives, from the MPPK 44, information indicating the RG operating rate calculated by the MPPK 44 and displays the RG operating rate. The operating rate may be displayed by any of the host computers 30, in addition to or in place of being displayed by the management computer 34.

The storage system 42 includes a storage unit 64 and the storage controller 38 coupled to the storage unit 64.

The storage unit 64 is configured with a plurality of PDEVs (or with a single PDEV 40). On the basis of the plurality of PDEVs 40, a plurality of RGs 41 are (or a single RG 41 is) configured. On the basis of the RG 41, the VOL 68 is created and provided to the host computer 30.

The storage controller 38 receives an I/O request from the host computer 30 and transmits the I/O command to the PDEV 40 corresponding to the destination of the I/O subject to the I/O request, the PDEV 40 being included in the RG 41 on which the VOL designated in the I/O request is based. The storage controller 38 includes a Frontend Interface (FE-I/F) 46, the BE-I/F 52, MPPKs 44, a memory 48, and a switch 50 coupled to these elements. The FE-I/F 46 and the BE-I/F 52 are each an example of an interface unit.

The FE-I/F is coupled to each of the host computers 30 and to the management computer 34 via the network and is also coupled to the MPPKs 44, the memory 48, and the BE-I/F 52 via the switch.

The MPPK 44 includes a Local Memory (LM) 58 and a Microprocessor (MP) 56. In the present embodiment, The MPPK 44 includes one LM 58 and one MP 56; however, the MPPK 44 may include two or more LMs 58 and two or more MPs 56. The MPs 56 includes a plurality of cores 54. One of the plurality of cores serves as a representative core 54R, while each of the remaining cores serves as a normal core 54N. In the present embodiment, Two MPPKs 44 are provided; however, the number of MPPKs 44 may be smaller than 2 or larger than 2. The MP 56 includes four cores 54. One of the cores 54 serves as the representative core 54R, whereas each of the other three cores 54 serves as the normal core 54N. The one or more MPs 56 included in one or more MPPKs 44 serve as an example of a processor unit.

The switch 50 couples elements to one another, the elements being the MPPKs 44, the FE-I/F 46, the BE-I/F 52, the memory 48, and the like.

The BE-I/F 52 controls I/O of data to and from the storage unit 64.

The memory 48 includes a Cache Memory (CM) 61 which temporarily stores therein the data that is input to and output from the storage unit 64, and a Shared Memory (SM) 62 which stores therein information shared between the MPPKs 44. The memory 48 is an example of a memory unit. The memory unit may include the LM 58.

Figure 6:
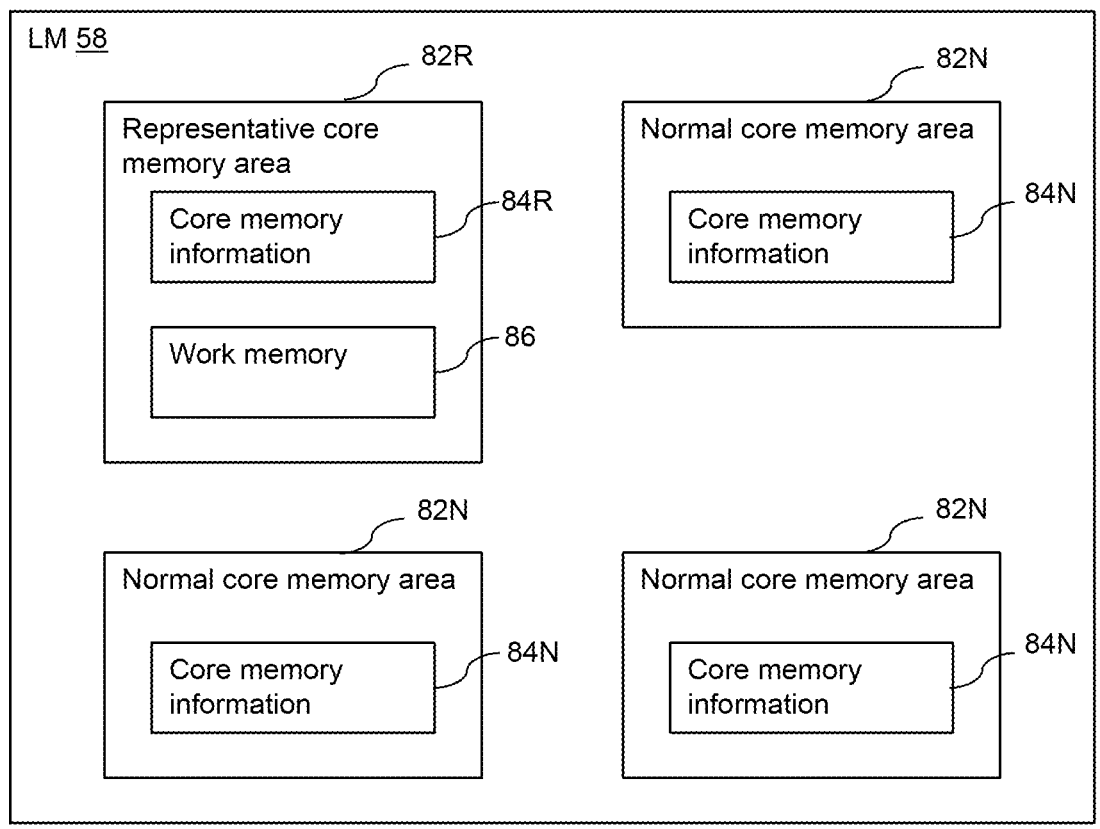
FIG. 6 is a block diagram illustrating a configuration of a Local Memory (LM).

FIG. 6 is a block diagram illustrating a configuration of the LM 58.

The LM 58 has a memory area 82 provided for each of the cores 54 included in the MPPK 44 that contains the LM 58. In the present embodiment, the LM 58 has one representative core memory area 82R and three normal core memory areas 82N.

The representative core memory area 82R stores therein core memory information 84R of the representative core 54R and includes a work memory 86. The normal core memory area 82N stores therein core memory information 84N of the normal core 54N corresponding to the memory area 82N.

Figure 7:
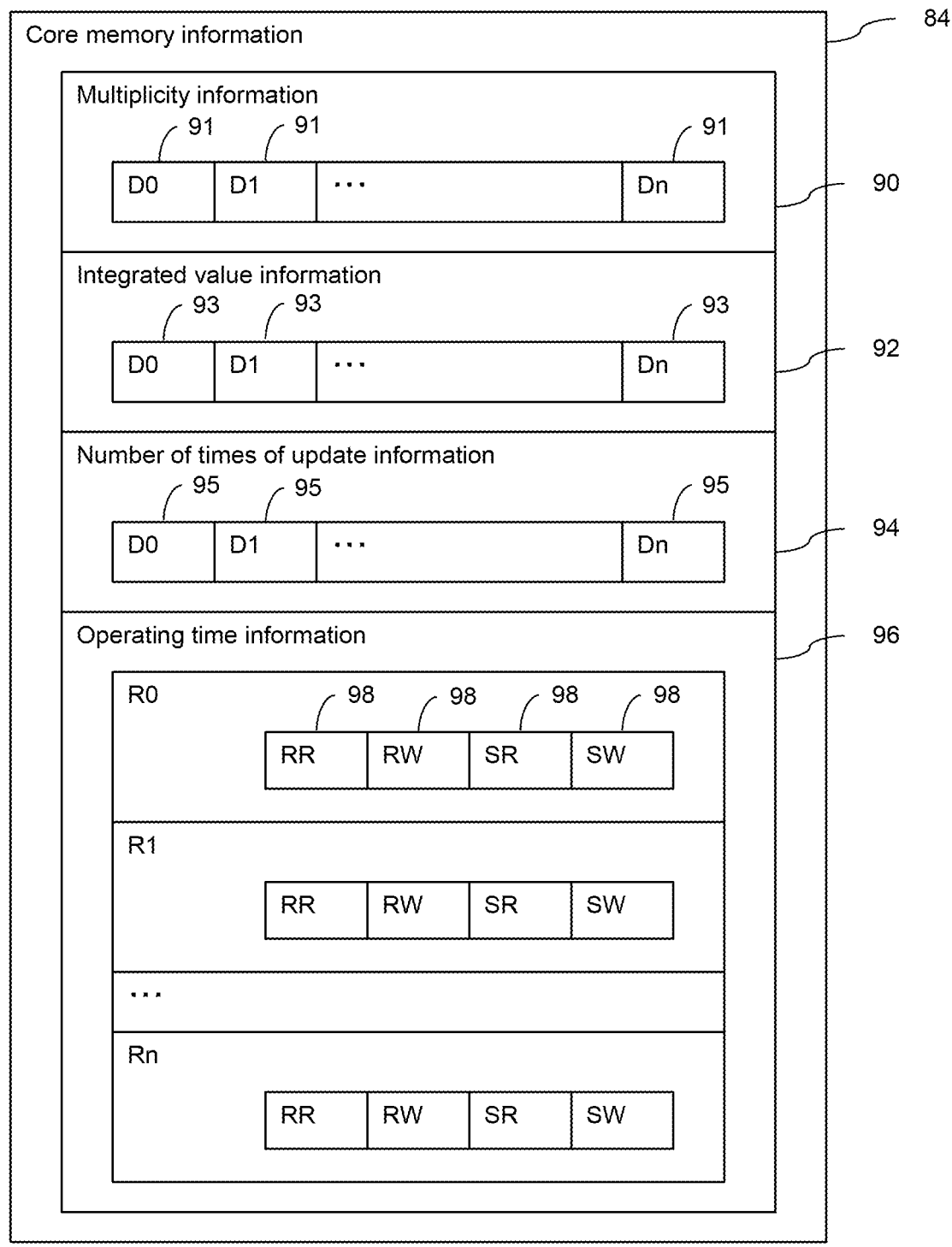
FIG. 7 is a block diagram of core memory information.

FIG. 7 is a block diagram of the core memory information 84. In the following sections, an example will be explained by using the core memory information 84 corresponding to one core 54. In the explanation of FIG. 7, the one core will be referred to as a "target core". Further, in FIG. 7 and the drawings thereafter, "Dx" (where x is an integer of 0 or larger) denotes identification information of the PDEV 40; "Ry" (where y is an integer of 0 or larger) denotes identification information of the RG 41. Further, "RR" denotes a random read, whereas "RW" denotes a random write. Also, "SR" denotes a sequential read, whereas "SW" denotes a sequential write. Here, the "random" and "sequential" refer to I/O patterns from the storage controller 38 (the MPPKs 44) to the RG 41.

The core memory information 84 includes multiplicity information 90, integrated value information 92, number of times of update information 94, and operating time information 96.

The multiplicity information 90 includes, for each of the PDEVs 40, backend multiplicity value (the degree of multiplicity of I/O commands from the target core to the BE-I/F 52) 91 with respect to the target core. The backend multiplicity value 91 is a value at a certain time point.

The integrated value information 92 includes, for each of the PDEVs 40, an integrated value 93 of back end multiplicity values in a certain cycle.

The number of times of update information 94 includes, for each of the PDEVs 40, the number of times of update (the number of times the integrated value has been updated) 95 indicating the number of times an integrated value 93 has been stored into the integrated value information 92.

The operating time information 96 includes operating time 98 for each of the RGs 41. With respect to each of the RGs 41, the operating time 98 is prepared for each of the I/O patterns. As explained above, there are four types of I/O patterns, namely, a random read, a random write, a sequential read, and a sequential write.

Figure 8:
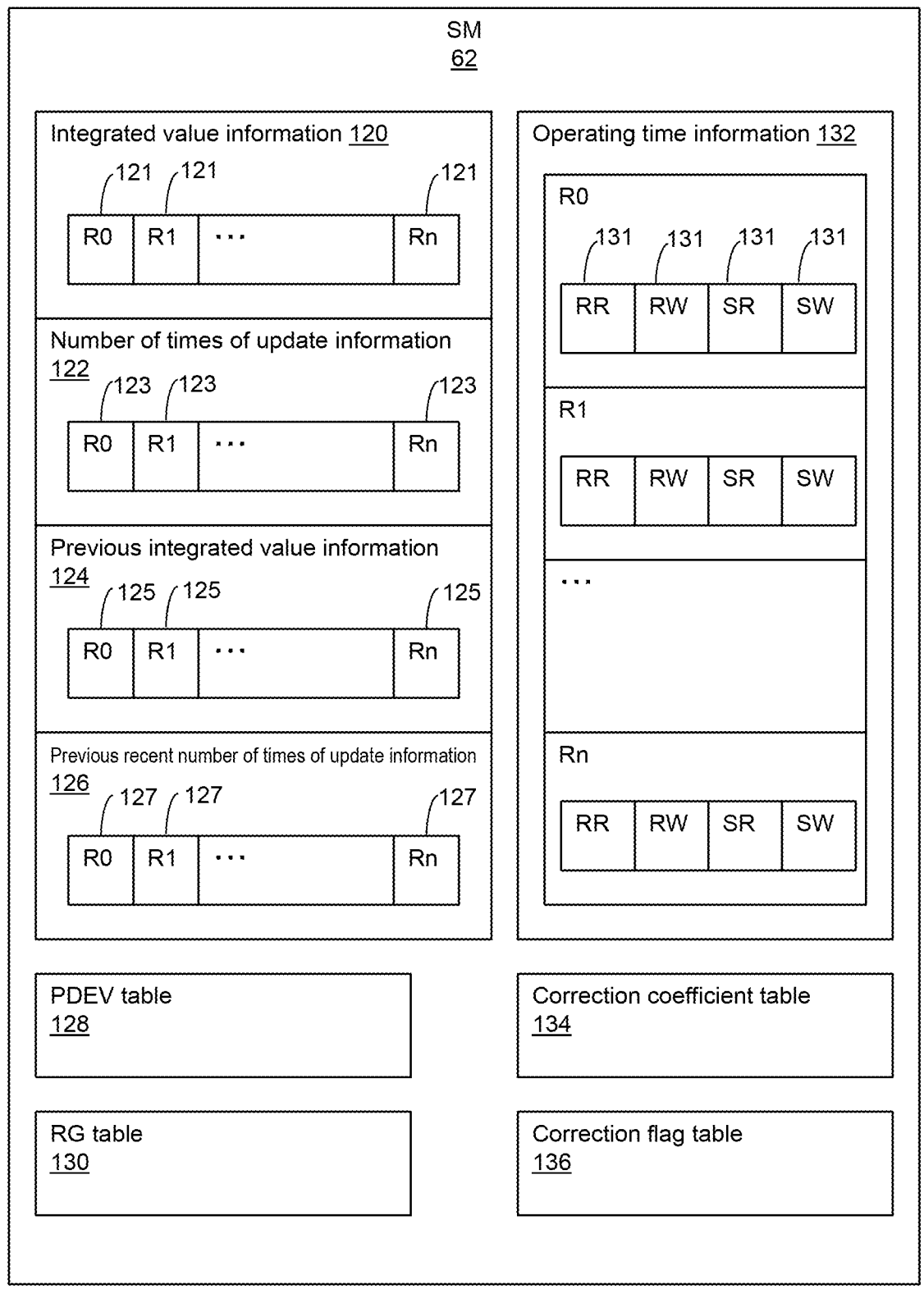
FIG. 8 is a block diagram illustrating information stored in a Shared Memory (SM).

FIG. 8 is a block diagram illustrating information stored in the SM 62.

The SM 62 stores therein integrated value information 120, number of times of update information 122, previous integrated value information 124, previous number of times of update information 126, operating time information 132, a PDEV table 128, an RG table 130, a correction coefficient table 134, and a correction flag table 136.

The integrated value information 120 includes, for each of the RGs 41, an aggregated integrated value 121 of backend multiplicity values in a certain cycle. For each of the RGs 41, the "aggregated integrated value" denotes a sum of a plurality of total integrated values each of which corresponds to each of the plurality of PDEVs 40 configuring the RG 41. With respect to each of the PDEVs 40, the "total integrated value" denotes a total of a plurality of integrated values (the plurality of integrated values each of which corresponds to each of the plurality of cores 54) corresponding to the PDEV 40. In other words, the integrated value information 120 is a result of aggregating pieces of integrated value information 92 from the plurality of core memory areas 82.

The number of times of update information 122 includes, for each of the RGs 41, the number of times of update (the number of times the integrated value has been updated) 123 indicating the number of times an integrated value has been stored into the integrated value information 120.

The previous integrated value information 124 includes, for each of the RGs 41, a previous integrated value (an aggregated integrated value from a previous process (e.g., the most recent process)) 125. The most recent number of times of update information 126 includes, for each of the RGs 41, the previous number of times of update (a previous (e.g., the most recent) number of times of update) 127.

The PDEV table 128 is a table storing therein information about the PDEVs 40. The RG table 130 is a table storing therein information about the RGs 41. The correction coefficient table 134 is a table storing therein information about correction coefficients. The correction flag table 136 is a table storing therein correction flags (explained later).

FIG. 9 is a diagram illustrating a configuration of the PDEV table 128.

The PDEV table 128 has an entry for each of the PDEVs 40. Each of the entries has information such as a PDEV 40 number and an installation flag.

The PDEV number 200 is an identification number of the PDEV 40. The installation flag 202 is a flag indicating whether or not the corresponding PDEV 40 is installed. "OFF" indicates that the PDEV 40 is not installed, whereas the "ON" indicates that the PDEV 40 is installed.

The number of entries is equal to the number of PDEVs 40 that are physically installable in the storage system 42. The values of the installation flags 202 are updated by the MPPK 44 on the basis of a PDEV installation status identified by the MPPK when the storage system is started up or when the storage configuration is changed.

FIG. 10 is a diagram illustrating a configuration of the RG table 130.

The RG table 130 has an entry for each of the RGs 41. Each of the entries has information such as an RG number 210, a RAID level 212, a RAID configuration 214, a PDEV type 216, and PDEV numbers 218.

The RG number 210 is an identification number of the RG 41. The RAID level 212 indicates the RAID level of a corresponding RG 41. The RAID configuration 214 indicates the RAID configuration of a corresponding RG 41. The PDEV type 216 indicates the type of the PDEVs 40 configuring a corresponding RG 41. The PDEV numbers 218 indicates the identification numbers of the PDEVs 40 configuring a corresponding RG 41.

FIG. 11 is a diagram illustrating a configuration of the correction coefficient table 134.

The correction coefficient table 134 stores therein a correction coefficient for each of the sets made up of a PDEV type and a RAID type. The RAID type is defined with a RAID level and a RAID configuration.

FIG. 12 is a diagram illustrating a configuration of the correction flag table 136.

The correction flag table 136 has a correction flag for each of the sets made up of a PDEV type and an I/O pattern. The correction flag indicates whether or not the operating time is to be corrected. "OFF" indicates that the operating time is not to be corrected, whereas "ON" indicates that the operating time is to be corrected.

FIG. 12 indicates that, when the PDEV 40 is an HDD, which is an example of the successive processing PDEVs, it is unnecessary to correct the operating time. The reason is that a difference in the degree of multiplicity among I/O commands is reflected in the operating time measured by the MPPK 44, because I/O commands are processed one by one in an HDD. Accordingly, the amount of calculation required for the calculation of the operating rate of an HDD is reduced.

Further, FIG. 12 indicates that it is unnecessary to correct the operating time when the I/O pattern is either a sequential write or a sequential read. The reason is that, for both a sequential write and a sequential read, successive processing PDEVs and multiple processing PDEVs hardly show any difference therebetween in the operating status thereof, regardless of the degree of backend multiplicity.

In the following sections, processes performed in the present embodiment will be explained.

Figure 13:
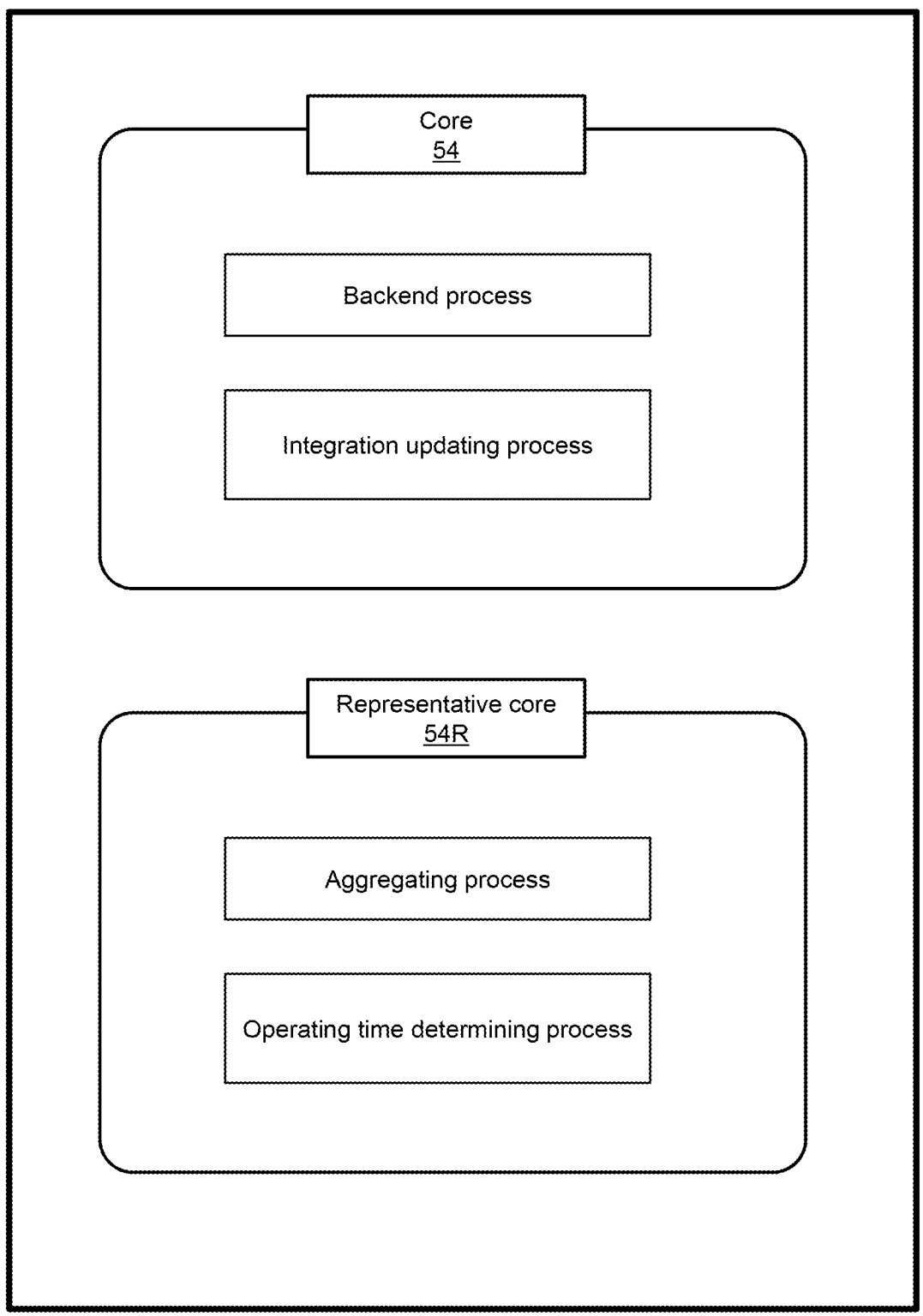
FIG. 13 is a schematic diagram of processes performed in the storage system.

FIG. 13 is a schematic diagram of processes performed in the storage system 42.

Each of the cores 54 performs a backend process. Further, each of the cores 54 performs an integration updating process.

Only the representative core 54R performs an aggregating process and an operating time determining process.

Figure 14:
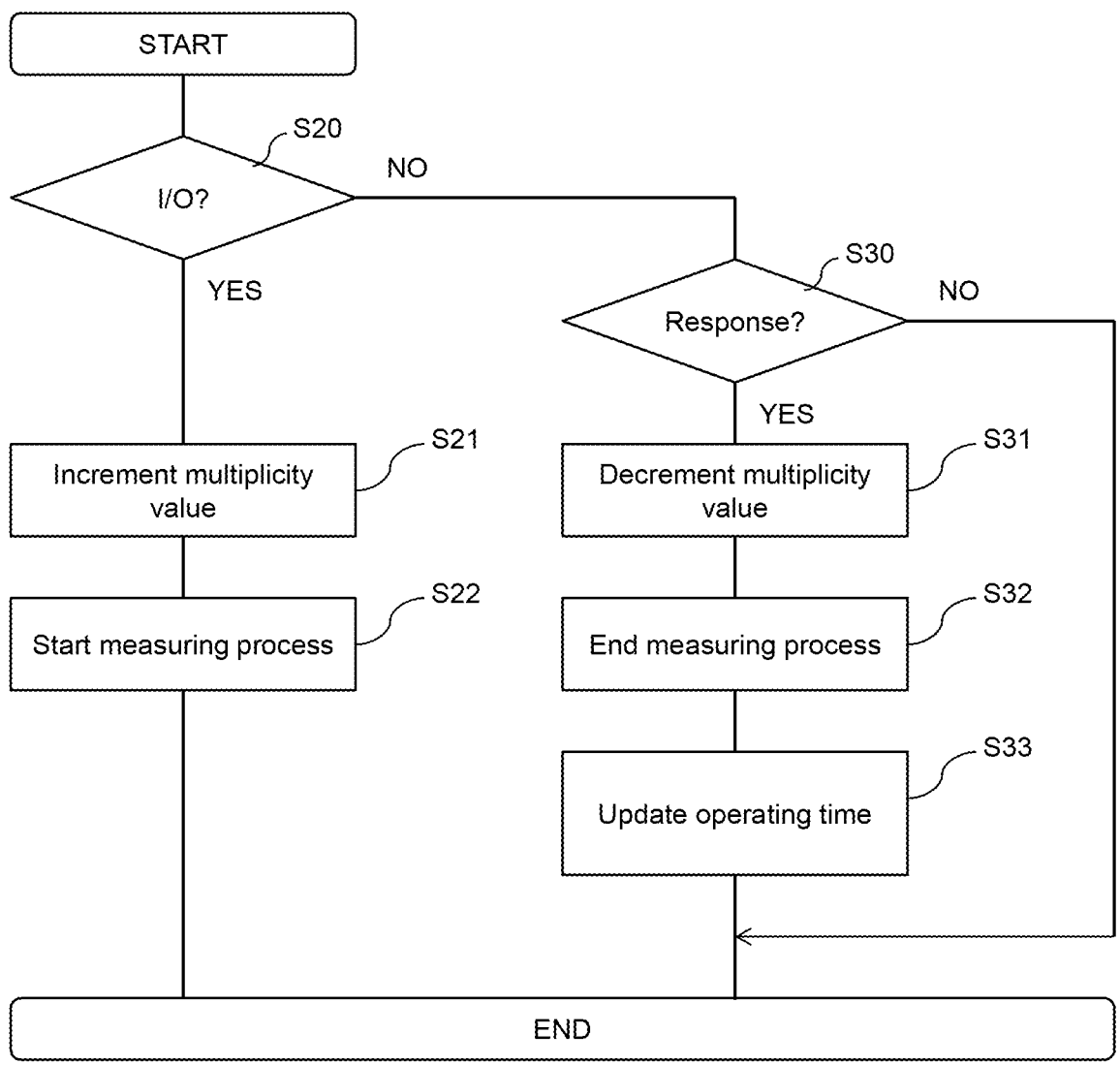
FIG. 14 is a flowchart illustrating a flow in a backend process.

FIG. 14 is a flowchart illustrating a flow in the backend process. In the explanation of FIG. 14, one core will be used as an example. The core will be referred to as a "target core" in the explanation of FIG. 14.

When issuing an I/O command to the BE-I/F 52 (S20: YES), the target core 54 increments the backend multiplicity value 91 corresponding to the destination PDEV 40 of the issued I/O command (S21). For example, when I/O commands are transmitted in a quadruple multiplexed manner as illustrated in FIG. 3, the backend multiplicity value 91 corresponding to the destination PDEV 40 of the issued I/O commands is incremented by four at S21. Subsequently, the target core 54 starts measuring the operating time (S22).

Further, when having received a response to an I/O command via the BE-I/F 52 (S30: YES), the target core 54 decrements the backend multiplicity value 91 corresponding to the destination PDEV 40 of the issued the I/O command (S31). For example, when four responses are respectively received in correspondence with the quadruple multiplexed I/O commands as illustrated in FIG. 3, the backend multiplicity value 91 corresponding to the destination PDEV 40 of the issued I/O commands is decremented by four at S31. Subsequently, the target core 54 ends the operating time measuring process (S32). The target core 54 identifies the RG 41 including the destination PDEV 40 out of the RG table 130 and further adds the operating time acquired at the end time point of S32 to the operating time 98 corresponding to the identified RG 41 and the I/O pattern related to the received response (S33).

Figure 15:
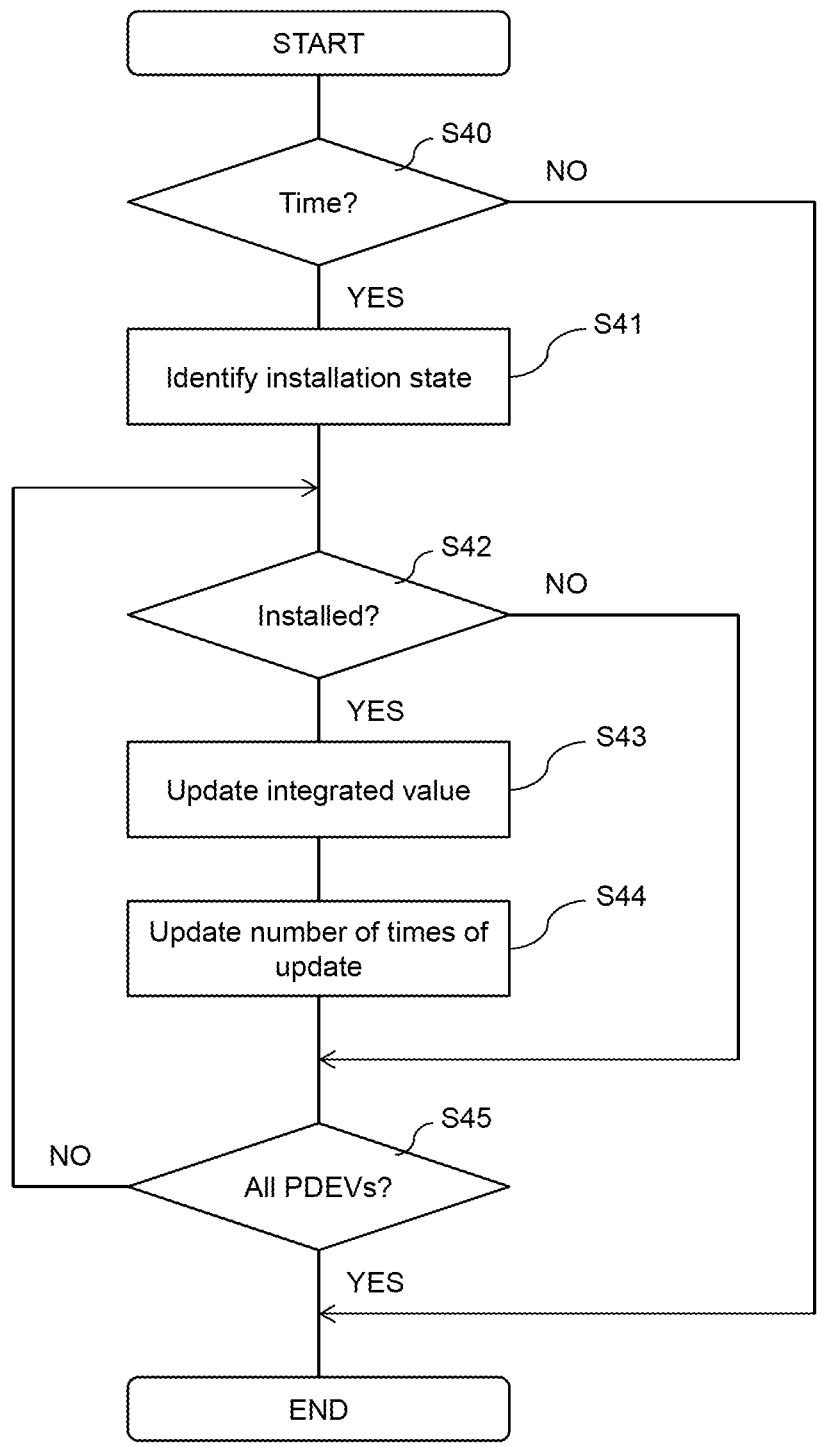
FIG. 15 is a flowchart illustrating a flow in an integration updating process.

FIG. 15 is a flowchart illustrating a flow in the integration updating process. In the explanation of FIG. 15, one core will be used as an example. The core will be referred to as a "target core" in the explanation of FIG. 15.

When the time (a cycle) to reflect information into the LM 58 has arrived (S40: YES), the target core 54 refers to the PDEV table 128 and identifies, for each of the PDEVs 40, whether or not the PDEV 40 is installed (S41).

With respect to one of the PDEVs 40 on which the processes at S42 and thereafter have not yet been performed, the target core 54 judges whether or not the PDEV 40 is installed (S42). When the judgment result at S42 is in the affirmative (S42: Yes), the target core 54 adds the backend multiplicity value 91 corresponding to the PDEV 40 to the integrated value 93 corresponding to the PDEV 40 (S43). Further, the target core 54 increments the number of times of update 95 corresponding to the PDEV 40 (S44). After S44 is performed or when the judgment result at S42 is in the negative (S42: NO), the target core 54 judges whether or not the processes at S42 and thereafter have already been performed on all the PDEVs 40 (S45). When the judgment result at S45 is in the negative, the process at S42 and thereafter are performed on one of the PDEVs 40 on which the processes at S42 and thereafter have not yet been performed.

Figure 16:
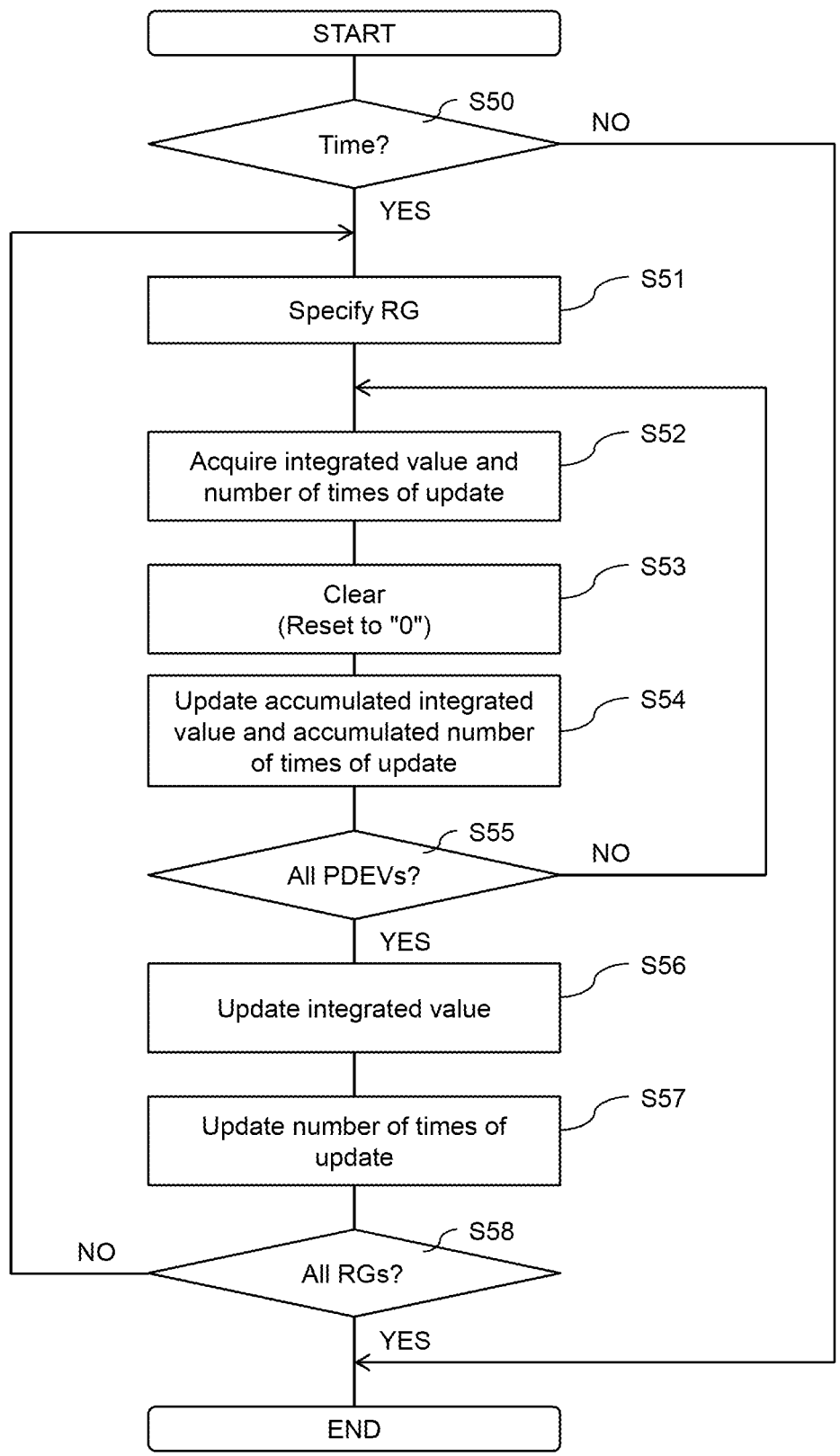
FIG. 16 is a flowchart illustrating a flow in an aggregating process.

FIG. 16 is a flowchart illustrating a flow in the aggregating process. In the explanation of FIG. 16, one representative core 54R will be used as an example. The representative core 54R will be referred to as a "target representative core" in the explanation of FIG. 16.

When the time (a cycle) to reflect information into the SM has arrived (S50: YES), the target representative core 54R acquires information about one of the RGs from the RG table 130 (S51).

With respect to the RG corresponding to the information acquired at S51, the target representative core 54R performs the processes described below. In the following sections, the RG will be referred to as a "target RG" in the explanation of FIG. 16.

From each of the core memory areas 82 in the LM 58, the target representative core 54R acquires the integrated values 93 and the numbers of times of update 95 corresponding to one of the PDEVs 40 within the target RG 41 and further stores the integrated values 93 and the numbers of times of update 95 that were acquired, into the work memory 86 (S52). Subsequently, the target representative core 54R sets the integrated values 93 and the numbers of times of update 95 (the values in each of the core memory areas 82) corresponding to the PDEV 40 to "0" (S53). Subsequently, the target representative core 54R adds the integrated values 93 and the numbers of times of update 95 that were stored at S52 to the accumulated integrated value and the accumulated number of times of update (the integrated value and the number of times of update that have been accumulated with respect to the target RG) in the work memory 86 (S54).

When there is a PDEV 40 in the target RG 41 on which the processes at S52 and thereafter have not yet been performed (S55: NO), the target representative core 54R performs the processes at S52 and thereafter on the PDEV 40. When the processes at step S52 and thereafter have been performed on all the PDEVs 40 in the target RG 41 (S55: YES), the target representative core 54R performs the processes at S56 and S57 on the target RG 41. In other words, the target representative core 54R adds a value (the quotient) obtained by dividing the accumulated integrated value in the work memory by the number of PDEVs (the quantity of the PDEVs 40 configuring the target RG 41) to the integrated value 121 corresponding to the target RG 41 (S56). Further, the target representative core 54R adds a value (the quotient) obtained by dividing the accumulated number of times of update in the work memory by the number of PDEVs (the quantity of the PDEVs 40 configuring the target RG 41) to the number of times of update 123 corresponding to the target RG 41 (S57).

When there is a RG 41 on which the process at S51 has not yet been performed (S58: No), the target representative core 54R performs the process at S51 on the RG 41.

Figure 17:
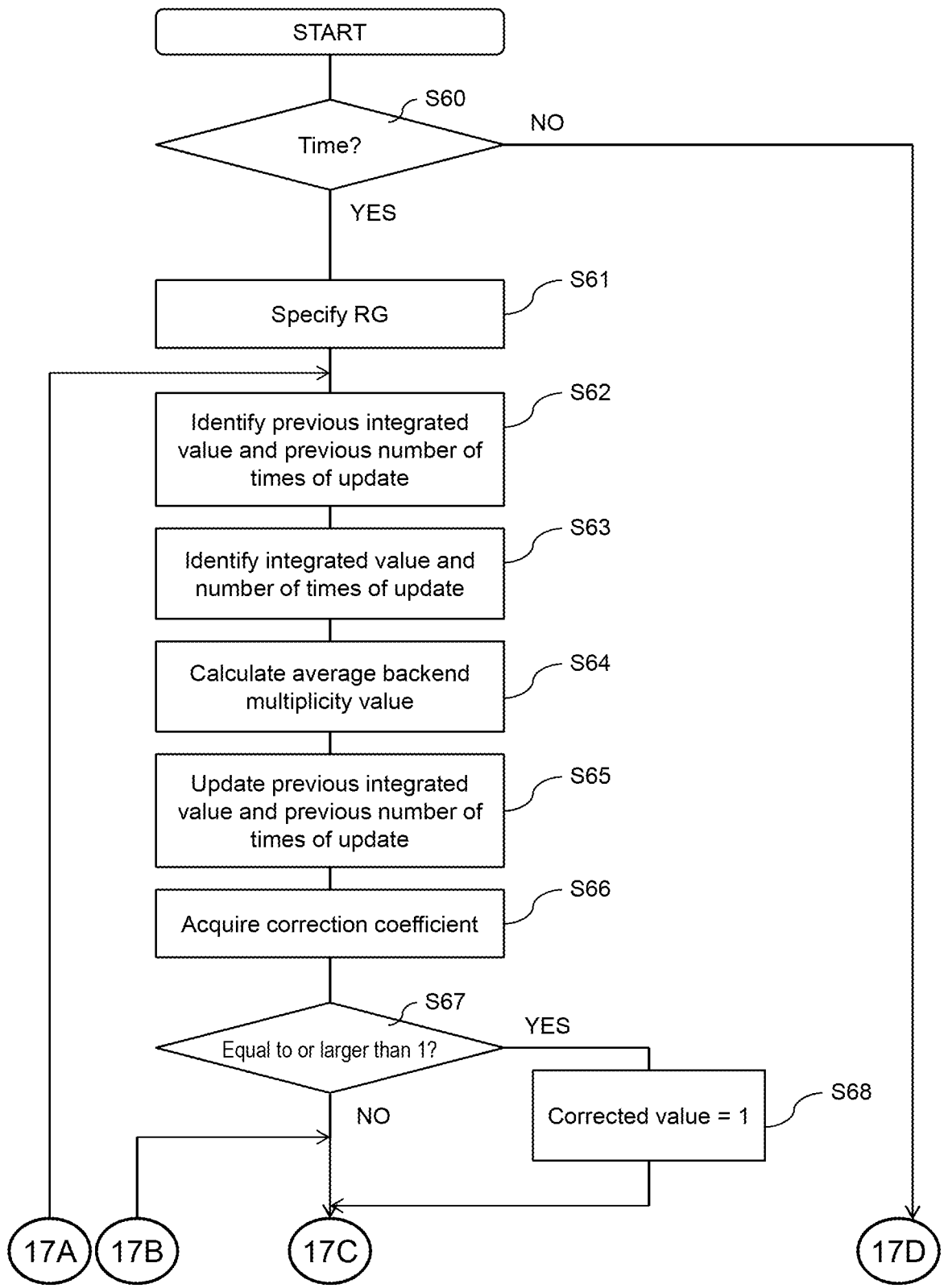
FIG. 17 is a part of a flowchart illustrating a flow in an operating time determining process.
Figure 18:
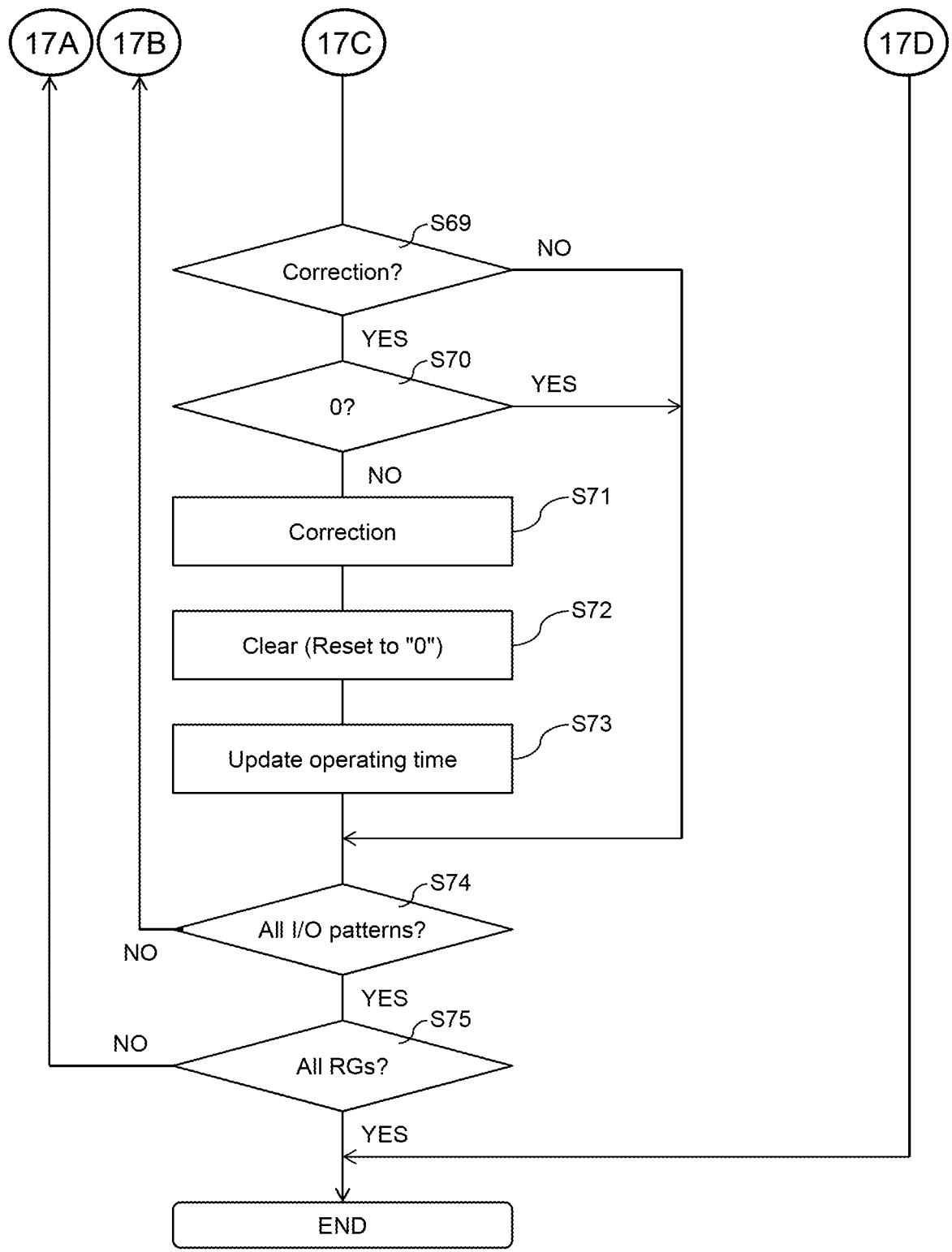
FIG. 18 is the remaining part of the flowchart illustrating a flow in the operating time determining process.

FIG. 17 and FIG. 18 are flowcharts illustrating a flow in the operating time determining process. In the explanations of FIG. 17 and FIG. 18, one representative core 54R will be used as an example. The representative core 54R will be referred to as a "target representative core" in the explanations of FIG. 17 and FIG. 18.

When the time (a cycle) to reflect information into the SM has arrived (S60: YES), the target representative core 54R acquires information about one of the RGs from the RG table 130 (S61).

With respect to the RG 41 corresponding to the information acquired at S61, the target representative core 54R performs the processes described below. In the following sections, the RG 41 will be referred to as a "target RG" in the explanations of FIG. 17 and FIG. 18.

The target representative core 54R acquires the previous integrated value 125 and the previous number of times of update 127 corresponding to the target RG 41 from the previous integrated value information 124 and the previous of times of update information 122 (S62). Subsequently, the target representative core 54R acquires the integrated value 121 and the number of times of update 123 corresponding to the target RG 41, from the integrated value information 120 and the number of times of update information 122 (S63).

Subsequently, the target representative core 54R calculates an average backend multiplicity value for a certain cycle, by dividing an integrated value difference ("the integrated value 121 acquired at S63"—"the previous integrated value 125 acquired at S62") by a difference in the numbers of times of update ("the number of times of update 123 acquired at S63"-"the previous number of times of update 127 acquired at S62") (S64). The average backend multiplicity value is an example of the RG backend multiplicity. Instead of the average backend multiplicity value, the RG backend multiplicity may be expressed with either the largest value or the smallest value among a plurality of backend multiplicity values corresponding to the plurality of PDEVs configuring the RG.

Subsequently, the target representative core 54R stores the integrated value 121 and the number of times of update 123 acquired at S63 into the previous integrated value information 124 and the previous number of times of update information 122 as the previous integrated value 125 and the previous number of times of update 127 (S65).

Subsequently, the target representative core 54R acquires a correction coefficient corresponding to the RAID type and PDEV type of the target RG 41, from the correction coefficient table 134 (S66).

Subsequently, the target representative core 54R judges whether or not a corrected value is equal to or larger than 1, the corrected value being a product of the correction coefficient acquired at S66 and the average backend multiplicity value calculated at S64 (S67).

When the judgment result at S67 is in the affirmative (S67: YES), the target representative core 54R sets the corrected value to 1 (S68). This process is performed for the purpose of preventing the operating time from being corrected to be a longer time period.

When the judgment result at S67 is in the negative (S67: NO), in other words, when the corrected value is smaller than 1, the target representative core 54R performs the processes at S69 and thereafter on one of the plurality of I/O patterns on which the processes at S69 and thereafter have not yet been performed. In the following sections, the I/O pattern will be referred to as a "target I/O pattern".

The target representative core 54R refers to the correction flag table 136 and judges whether or not the correction flag corresponding to the PDEV type of the target RG 41 and the target I/O pattern is "ON" (S69).

When the judgment result at S69 is in the affirmative (S69: YES), the target representative core 54R judges whether or not the corrected value with respect to the target RG 41 is 0 (S70). For example, with respect to an HDD, which is an example of the successive processing PDEVs, because it is unnecessary to correct the operating time, the correction coefficient may be 0, and the corrected value may therefore be 0.

When the judgment result at S70 is in the negative (S70: NO), in other words, when the corrected value is larger than 0, the target representative core 54R identifies the operating time 131 corresponding to the target RG 41 and to the target I/O pattern from the operating time information 132 and further calculates the product of the identified operating time 131 and the corrected value as corrected operating time (S71). Subsequently, the target representative core 54R sets the operating time 131 (the value in the operating time information 132) acquired at S71 to "0" (S72). The target representative core 54R overwrites the post-update value ("0") at S72 with the corrected operating time, as the operating time 131 corresponding to the target RG 41 and to the target I/O pattern (S73).

When there is a I/O pattern on which the processes at S69 and thereafter have not yet been performed (S74: NO), the target representative core 54R performs the processes at S69 and thereafter on the I/O pattern.

Further, when there is a RG on which the processes at S62 and thereafter have not yet been performed (S75: NO), the target representative core 54R performs the processes at S62 and thereafter on the RG.

The one embodiment has thus been explained. However, the embodiment is merely described as an example for the purpose of explaining the present invention. Thus, it is not our intention to limit the scope of the present invention only to the embodiment described above. It is also possible to carry out the present invention in other various modes.

For example, the RG table 130 may register therein, for each of the RGs, an RG operating rate (={(operating time or corrected operating time)/sampling time}×100(%)). The RG operating rate may be calculated and registered by the MPPK 44 (e.g., the representative core 54R). In this situation, the corrected operating time is the product of the operating time and the corrected value, as explained above.

Further, for example, the correction coefficient for each of the sets made up of a PDEV type and a RAID type may dynamically be updated. More specifically, for example, while the storage system 42 is in operation, the MPPK 44 may regularly register therein a backend multiplicity value and an IOPS ratio for each of the sets made up of a PDEV type and a RAID type and may further calculate a correction coefficient on the basis of the registered values, and register the calculated correction coefficient into the correction coefficient table 134.

Further, for example, instead of the storage controller 38, either the host computers 30 or the management computer 34 may perform one or both of correcting the operating time and calculating the PDEV operating rate.

Further, for example, the RG operating rate to be displayed may be an RG operating rate corresponding to each of the I/O patterns or may be an average value of (or the smallest value or the largest value among) a plurality of operating rates respectively corresponding to the plurality of I/O patterns.

Further, for example, the I/O patterns may be two types, namely, a sequential I/O and a random I/O.

Further, for example, instead of calculating the RG operating rate on the basis of the operating time or the corrected operating time of each of the plurality of PDEVs configuring the RG, it is also acceptable to calculate the operating rate of the PDEV on the basis of the operating time or the corrected operating time of the PDEV. It is also acceptable to calculate the operating rate of the RG on the basis of the operating rates of the plurality of PDEVs configuring the RG. Further, in place of or in addition to the RG operating rate, the PDEV operating rates may be displayed.

Further, for example, the present invention is applicable to the calculation of not only the RG operating rate, but also any other type of system load that is calculated on the basis of the PDEV operating time (an example of the PDEV operating statuses).

REFERENCE SIGNS LIST 42 storage system
The invention claimed is:
1. A storage system comprising:
a RAID group (RG) including a plurality of physical storage devices (PDEVs); and a storage controller configured to receive an I/O request and to transmit I/O command to the PDEV corresponding to a destination of an I/O subject to the I/O request, wherein the storage controller is configured to:
measure RG operating time, which is operating time of the RG, by measuring, for each of the plurality of PDEVs configuring the RG, the operating time indicating a time period from a time when an I/command is issued to the PDEV to a time when a response to the I/command is received from the PDEV;
and correct the RG operating time used for calculating an RG operating rate to be displayed, wherein the corrected operating time is a product of the operating time, a correction coefficient corresponding to a PDEV type of the RG, and RG backend multiplicity value indicating a number of I/O commands issued to the RG in a multiplexed manner.

2. The storage system according to claim 1, wherein the RG operating time is corrected, when the PDEV type indicates multiple processing PDEV that is PDEV capable of processing a plurality of I/O commands in a multiplexed manner, and
the RG operating time is not corrected when the PDEV type indicates successive processing PDEV that is PDEV configured to process I/O commands one by one.

3. The storage system according to claim 2, wherein the correction coefficient corresponding to the PDEV type indicates successive processing PDEV is 0.

4. The storage system according to claim 2, wherein a method for calculating the RG operating rate on the basis of the RG operating time is a ratio of the corrected operating time and a sampling time.

5. The storage system according to claim 1, wherein
in addition to the PDEV type of the RG, the correction coefficient also corresponds to a RAID type conforming to a RAID level and a RAID configuration of the RG.

6. The storage system according to claim 1, wherein
the RG operating time is measured in correspondence with each of I/O patterns of the RG, and
the RG operating time corresponding to a random I/O is corrected, whereas
the RG operating time corresponding to a sequential I/O is not corrected.

7. The storage system according to claim 1, wherein
the correction coefficient is a value calculated on a basis of a relationship between an actual measured value of a load on a frontend side of the storage controller and an actual measured value of a load on a backend side of the storage controller.

8. The storage system according to claim 7, wherein the actual measured value of the load on the frontend side is a value conforming to frequency with which I/O requests are received, and the actual measured value of the load on the backend side is a degree of multiplicity of the I/O commands.

9. The storage system according to claim 1, wherein
when the corrected value exceeds 1, the storage controller arranges the corrected value to be 1.

10. A storage management method comprising:
measuring RG operating time, which is operating time of a RAID Group (RG), by measuring, for each of a plurality of physical storage devices (PDEVs) included in the RG, operating time indicating a time period from when an I/O command is issued to the PDEV to a time when a response to the I/O command is received from the PDEV;
and correcting the RG operating time used for calculating an RG operating rate to be displayed, wherein the corrected operating time is a product of the operating time, a correction coefficient corresponding to a PDEV type of the RG, and RG backend multiplicity value indicating a number of I/O commands issued to the RG in a multiplexed manner.

* * * * *